United States Patent [19]

Sevigny

[11] Patent Number: 6,052,109
[45] Date of Patent: Apr. 18, 2000

[54] PROCESSING IMAGE DATA

[75] Inventor: Benoit Sevigny, Montreal, Canada

[73] Assignee: Discreet Logic, Inc., Montreal, Canada

[21] Appl. No.: 08/834,054

[22] Filed: Apr. 11, 1997

[30] Foreign Application Priority Data

Apr. 12, 1996 [GB] United Kingdom .................... 9607647

[51] Int. Cl.[7] ...................................................... G09G 5/08
[52] U.S. Cl. ........................... 345/145; 345/139; 345/442
[58] Field of Search .............................. 340/729; 345/126, 345/136, 139, 145, 420, 427, 425, 437

[56] References Cited

U.S. PATENT DOCUMENTS

| | | | |
|---|---|---|---|
| 4,683,468 | 7/1987 | Himelstein et al. | 340/709 |
| 4,855,927 | 8/1989 | Seki et al. | 364/474.29 |
| 4,860,217 | 8/1989 | Sasaki et al. | 395/125 |
| 4,951,040 | 8/1990 | McNeil et al. | 340/729 |
| 5,119,309 | 6/1992 | Cavendish et al. | 364/474.24 |
| 5,592,599 | 1/1997 | Lindholm | 395/127 |

FOREIGN PATENT DOCUMENTS

| | | |
|---|---|---|
| 0 314 395A1 | 5/1989 | European Pat. Off. . |
| 2 229 336 | 9/1990 | United Kingdom . |
| 2 284 524 | 6/1995 | United Kingdom . |
| 2295301A | 5/1996 | United Kingdom . |
| WO93/012 502 | 6/1993 | WIPO . |

OTHER PUBLICATIONS

"Moving Pictures . . . " (APEX Media product review), Atari World, Oct. 1995, 3 pages.
APEX Media, animation and graphic program description printed from Internet site, Feb. 13, 1998, 5 pages.

*Primary Examiner*—Bipin Shalwala
*Assistant Examiner*—Jeff Piziali
*Attorney, Agent, or Firm*—Skjerven, Morrill MacPherson, Franklin & Friel; Alan H. MacPherson; Omkar K. Suryadevara

[57] ABSTRACT

Displayed picture points are re-locatable in response to manual operation of an interface device such as a stylus or a mouse etc. The interface device is activated, by being placed into pressure or by clicking, and an identified picture point is subsequently moved in response to manual operation of the interface device. In response to said picture point being moved, other picture points are also moved by a displacement which differs from the displacement of the identified picture point and which varies in proportion to the original distance of the other picture point from the identified picture point.

8 Claims, 9 Drawing Sheets

I + 20

I + 20

I + N

I + N

600

PROCESSING IMAGE DATA

The present invention relates to processing image data, wherein displayed picture points are relocatable in response to manual operation of an interface device.

INTRODUCTION

Systems for processing image data in response to manual operation of a control device are known, in which image data is stored as an array of pixel values. Each pixel value may represent a luminance level or, in a full color system, pixel values may be stored for color components such as additive red, green, blue components, subtractive cyan, magenta, yellow and black components or, particularly in video systems, luminance plus chrominance color difference components.

In addition to application in television post production facilities, systems of this type are being used increasingly for the production of cinematographic film, where the information content for each frame of film is substantially higher. Film clips are scanned on a frame-by-frame basis producing large volumes of image data for subsequent manipulation. Pixel data may be processed under program control to produce visual effects and a system of this type is produced by the present applicant and distributed under the trade mark "FLAME". Thus, in addition to manipulating images as part of a post production process, it may become necessary to make manual modifications to image data, possibly to remove unwanted items from an image or to change or add color etc.

Traditionally, in order to make manual operations, each frame must be examined to allow manual modifications to be made to the image data on a frame-by-frame basis. This takes a considerable amount of time and limits the extent to which techniques of this type may be implemented for particular productions.

In particular, in a function known as "warping", a grid or mesh is superimposed over an area of an image on a display device, and selected points of that mesh are translated, rotated, or reduced in size, with the effect that the whole mesh is correspondingly translated, rotated or reduced.

During warping operations, control points on an image frame are moved on a frame by frame basis. Since an image contains a large number of pixels, it is not feasible to manually move each pixel on a frame by frame basis. In these situations, processes are applied by which a region of an image can be warped by identifying a few control points, typically at the periphery of a desired image portion, in order to define a mesh covering the image portion. A warp function is applied to the mesh which moves the remaining pixel portion of the image in accordance with movements of the mesh. However, such warping techniques, although allowing a warp to be carried out in a relatively short time, introduce distortions particularly at the edges of the warped image portion. Such edges need to be "smoothed out" to reduce the visual distortions and visible discontinuities on the resultant warped image.

Presently, it is known to make manual operations to each frame for smoothing out the edges of a warped region. However, each frame requires much work and, as an example, to produce five seconds of warped film footage having discontinuities smoothed out, can take up to three weeks of work. Film Directors are therefore reluctant to make heavy use of warping techniques due to the high cost of post production procedures involved.

SUMMARY OF THE INVENTION

According to the first aspect of the present invention there is provided a method of processing image data, wherein displayed picture points are relocatable in response to manual operation of an interface device, comprising steps of moving an identified picture point in response to said manual operation; and moving other picture point data by a displacement which differs from the displacement of said identified pictured point and which varies in proportion to distance from the identified picture point.

Preferably, the identified picture point is identified by a displayed cursor and said cursor may be moved in response to movement of a stylus or a mouse.

In a preferred embodiment, a picture point is identified as a transition between image colours.

According to a second aspect of the invention, there is provided an image data processing apparatus, including display means for displaying picture images in the form of a plurality of picture points; a manually operable interface device; and processing means configured to relocate the position of said picture point in response to manual operation of said interface device, wherein said processing device is configured such that the movement of a first picture point in response to operation of said manual device results in the movement of other picture point data by displacements which differ from the displacement of an identified picture point and which vary in proportion to distance from said identified picture point.

DETAILED DESCRIPTION OF THE PREFERRED EMBODIMENTS

Figure 1:
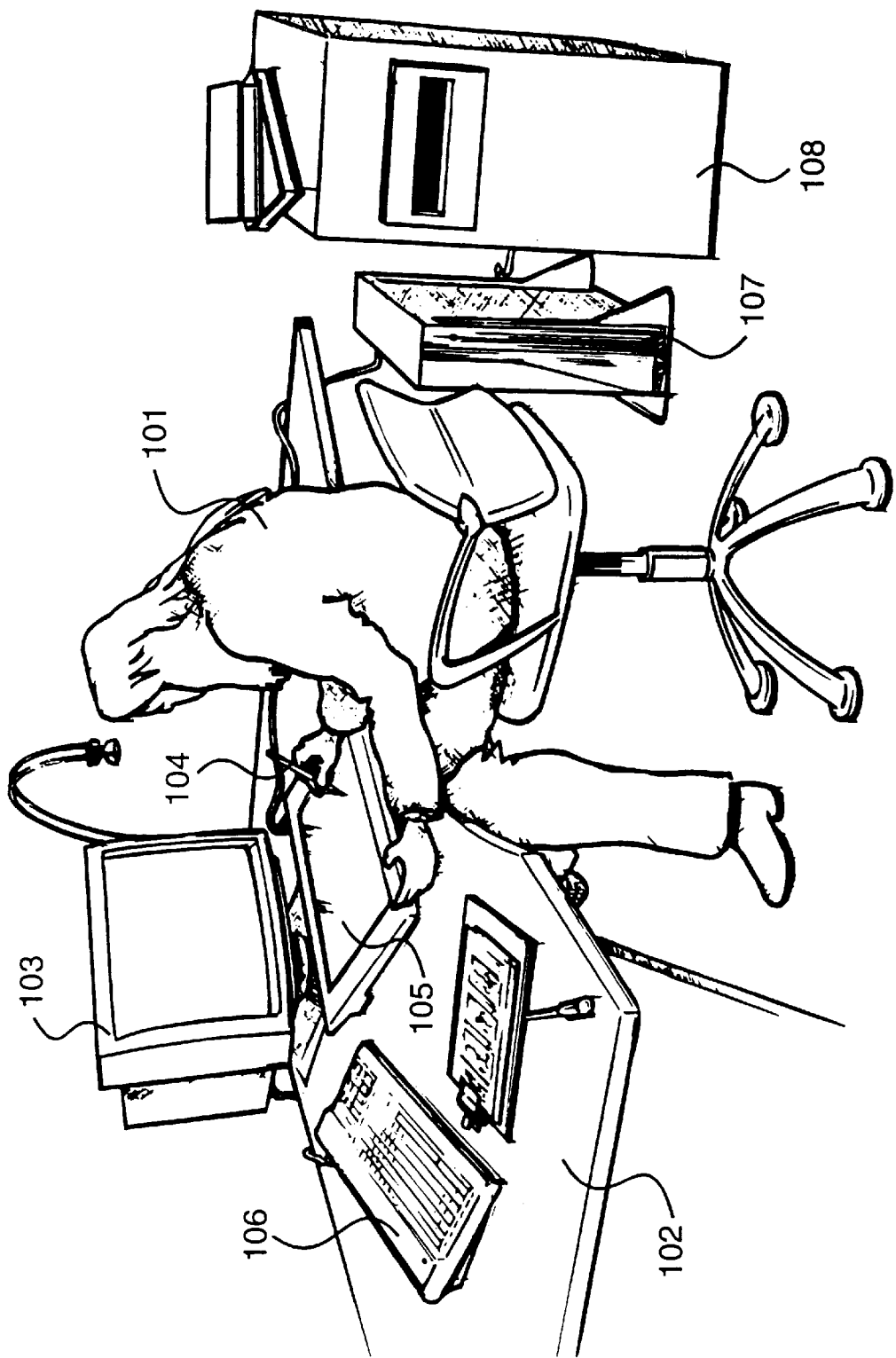
FIG. 1 shows in general view an editing suite for editing film clips, video images or computer generated images.

Referring to FIG. 1 of the accompanying drawings, a film, video or computer generated image editing suite comprises an image display device 103 e.g. a high resolution video monitor; a control key pad 106; and a graphics tablet 103 and stylus 104 for applying modifications to the displayed image.

Figure 2:
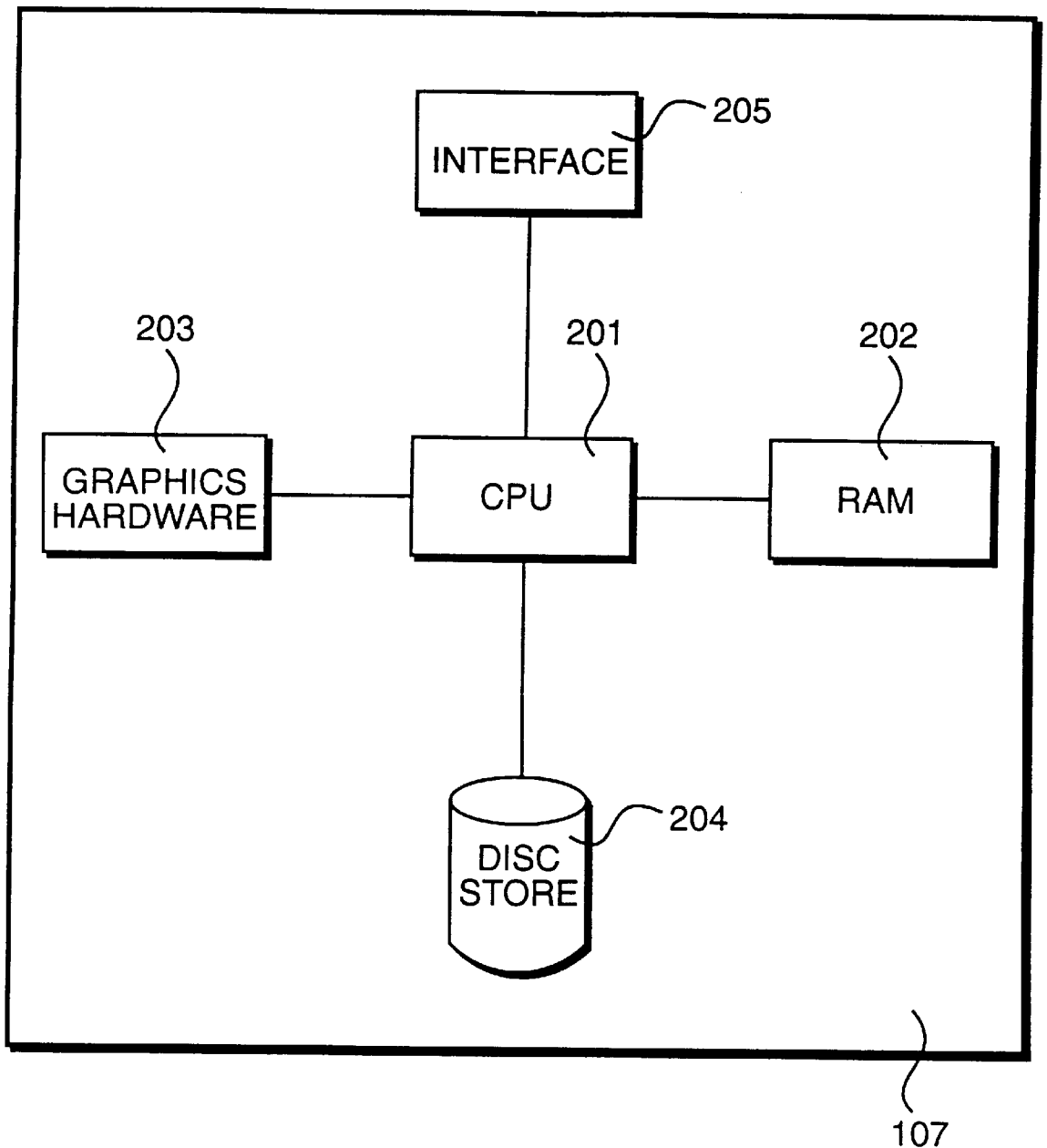
FIG. 2 shows a general layout comprising the editing suite of FIG. 1.

FIG. 2 shows in schematic form features comprising the image processing apparatus. There is provided a central processing unit 201, a random access memory 202, a graphics hardware device 203, a hard disk storage unit 204, and a graphics interface 205.

In the example of the preferred embodiment a post production process will be considered in which source material, in the form of a film clip, has been recorded and is being processed prior to a final on-line editing operation being performed.

A post production facility is illustrated in FIG. 1, in which a video artist 101 is seated at a processing station 102. Images are displayed to the artist via a visual display unit 103 and manual modifications to displayed images are effected in response to manual operation of a stylus 104 upon a graphics touch tablet 105. In addition, a conventional keyboard 106 is provided to allow alpha-numeric values to be entered directly. The monitor 103, tablet 105 and keyboard 106 are interfaced to an image processor 107, which may be based substantially upon a graphics workstation executing the UNIX operating system.

Image data is supplied to the image processor 107 via a digital video tape recorder 108, which may be configured to supply full bandwidth broadcast quality video data to the image processor at video rate. Alternatively, general purpose data storage tape drives may be used and image frames substantially larger than video frames, such as image frames derived from cinematographic film, may be received and processed within the system.

Image processor 107 is detailed in FIG. 2. The processor includes a central processing unit 201, arranged to receive program instructions from an addressable random access memory 202. The processing unit 201 may also access a hardware graphics card 203, provided as part of the UNIX environment, allowing computationally extensive operations to be effected at very high speed.

Image data is held within the random access memory 202 as modifications are taking place and large data volumes are held on a disk store 204, preferably taking the form of an array of concurrently accessible disks. The processing unit 201 communicates with the display unit 103, the graphics tablet 105, the keyboard 106 and the video recorder 108 via interface circuits 205 and additional interface circuits may be provided, such as an SCSI interface etc., to allow communication with conventional data manipulation and storage devices etc.

Figure 3:
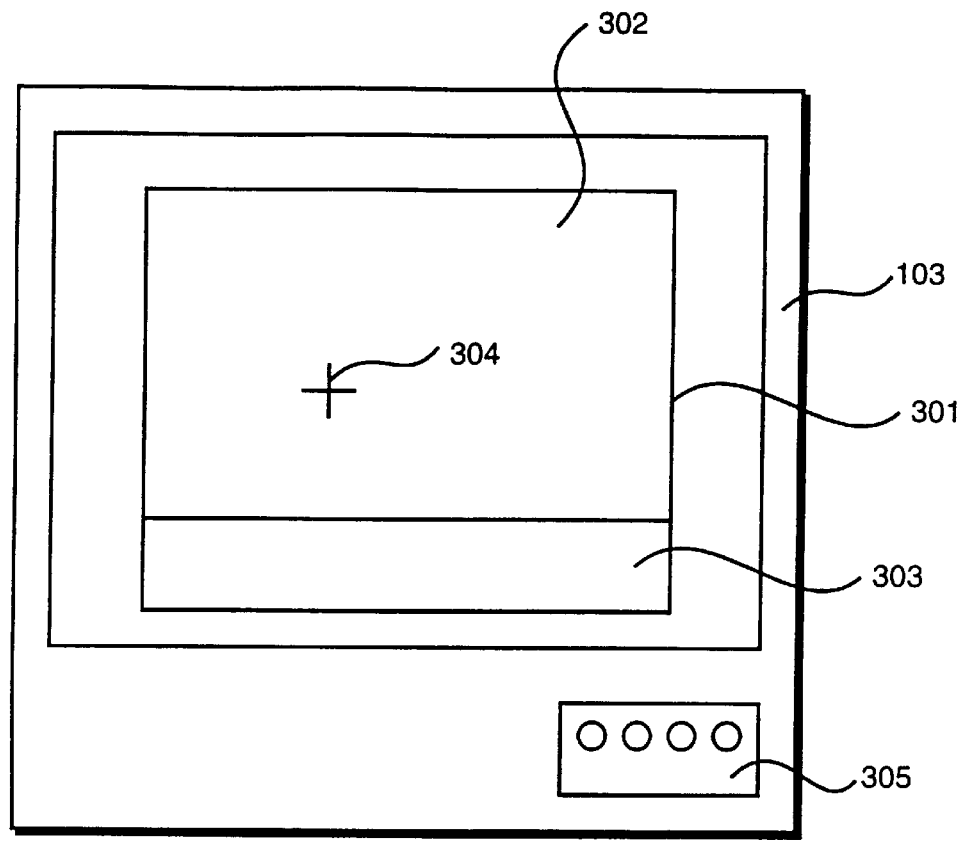
FIG. 3 shows a display device comprising the editing suite of FIG. 1.

In response to program instructions read from RAM 202, the CPU 201 generates image data which is in turn displayed on the display unit 103. Display unit 103 is a twenty inch non-interlaced visual display unit. Display unit 103 is detailed in FIG. 3. A displayed image 301 may be considered as being made up of two component parts, taking the form of a working "canvas" 302 and a control panel 303. Image data is displayed in the region of said canvas 302 either as individual frames or as a moving video/film clip.

While an image is being displayed on the canvas 302, pixel data may be modified in response to manual operations of the stylus 104 upon the touch tablet 105. The position of the stylus 104 is identified to the artist 101 by means of a cursor 304, which tracks the position of the stylus 104 as it is moved over the touch tablet 105. The monitor 103 includes a control panel 305 for the control of monitor variables, as is well known in the art.

Figure 4:
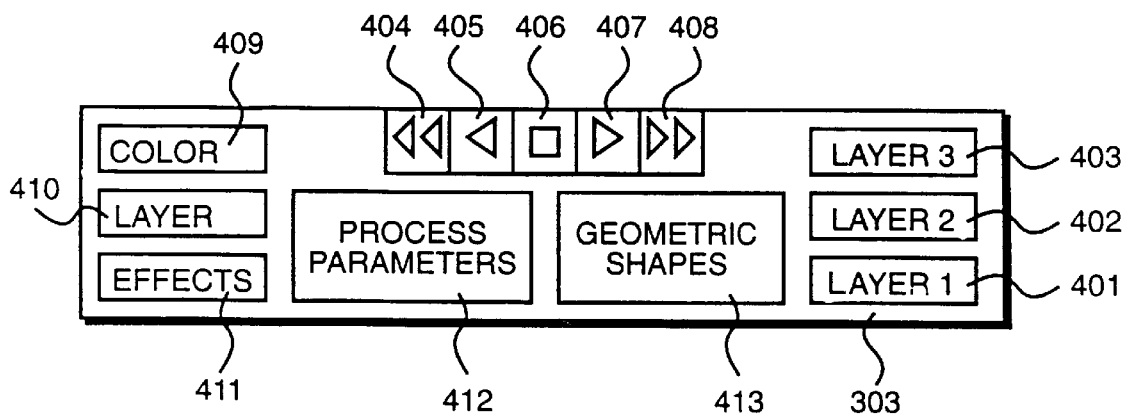
FIG. 4 shows a control panel feature of the display device of FIG. 3.

In addition to effecting interactive modification to displayed images, by positioning the cursor within region 302, control operations are similarly effected by moving said cursor into region 303. Control region 303 is detailed in FIG. 4.

New data objects are stored with reference to particular data layers in which a first layer may be considered as background image data, with a second layer of data taking priority over said first and a third layer of data taking priority over the second. This arrangement of layers is substantially similar to the layering of video source material in on-line mixing systems, in which images are combined using smooth keying or matting signals so as to achieve a smooth blending to create realistic-looking composites. In operation, modifications may be made within any of these layers and an appropriate layer is selected, layer 1, layer 2 or layer 3, by placing the cursor 304 over a respective layer "button" 401, 402, 403 and placing the stylus 104 into pressure.

The system may be used to display moving video clips, with soft controls being provided substantially similar to those known within video tape recorders etc. Thus, the control display includes a fast rewind button 404, a reverse button 405, a stop button 406, a play button 407 and a fast forward button 408.

Processes are selectable using process selection buttons 409, 410 and 411. Button 409 selects the color mode of operation, in which manual modifications may be made through pixels displayed within the canvas 302. Button 410 allows layer information to be considered and in particular it allows various constructed objects to be allocated to particular layers. Button 411 allows visual effects to be controlled. Upon selection of button 409, 410 or 411 associated process parameters are displayed in a modifiable fashion within region 412. Region 413 allows geometric shapes to be selected, such as circles, ellipses, squares and rectangles, which are then generated automatically at locations within the canvas 302 identified by the cursor 304.

Consideration may now be made to the initial problem, of the smoothing out of the periphery of warped images.

Figure 6:
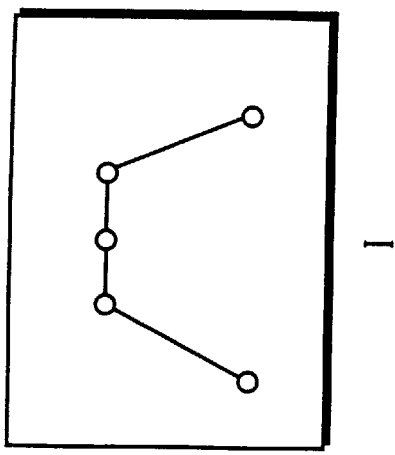
FIG. 6 shows the vertices of FIG. 5 in the second position.
Figure 5:
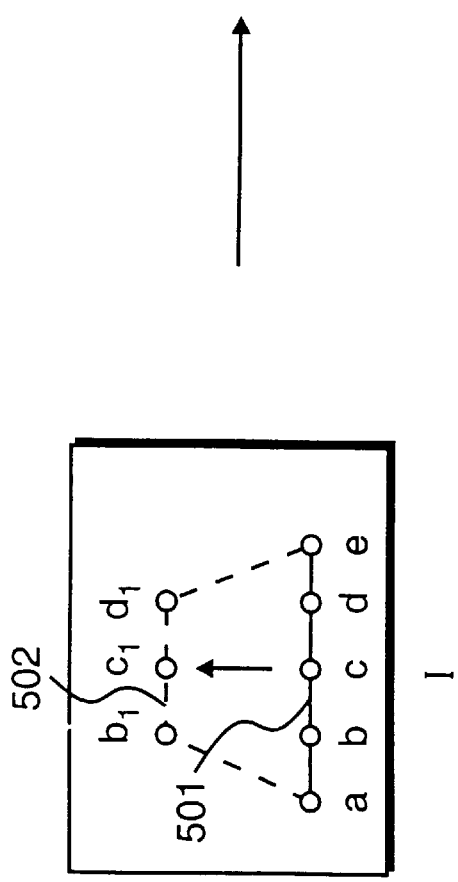
FIG. 5 shows an Ith image frame displayed on the display device, in which a group of vertices are translated as a whole from a first position to a second position.

To illustrate a first method of producing a warp, reference will be made to FIGS. 5 and 6 of the accompanying drawings.

Points a to e of an image frame I undergo a translation as part of the warp, such that points a and e remain in their original positions, and points b, c and d are translated to new positions b1, c1, d1. The result of the warp translation is shown in FIG. 6. However, since the points b, c, d are selected as a group and translated as a group, there is a perceived discontinuity around an edge of a warped image, which in the finished film clip or video clip leads to lack of realism as perceived by a viewer.

Figure 8:
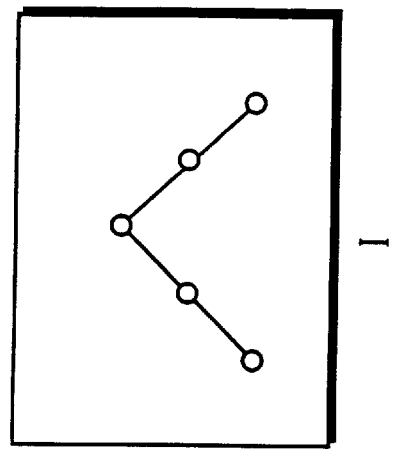
FIG. 8 shows the resultant smoothed image of FIG. 7.
Figure 7:
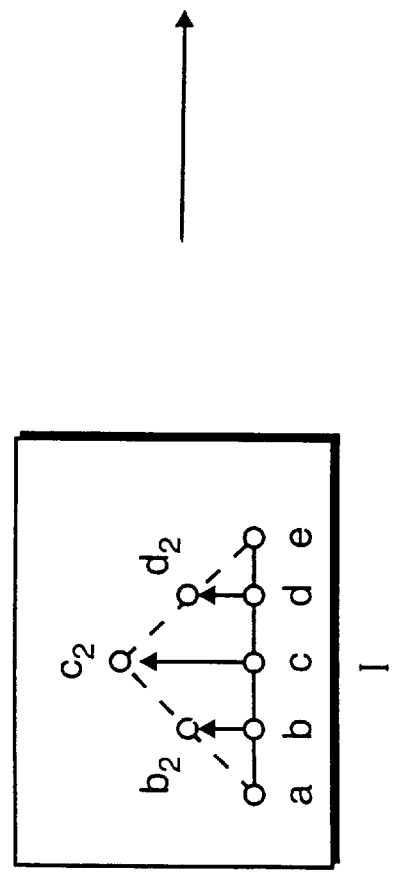
FIG. 7 illustrates a method of moving the group of vertices individually one by one, between an initial position and positions intermediate between an initial position and a final position, in order to perform a "smoothing" operation.

Referring to FIGS. 7 and 8, the warp translation may be improved by, rather than moving selected points b, c, d as a group in a single translation, individually moving selected points b, c, d to respective new positions b2, c2, d2 as shown in FIG. 7. This may result in a "smoothing out" of the discontinuity as compared with the warp method of FIG. 5. An illustrative result of individually moving the points b, c, d is shown in FIG. 8.

It will be appreciated that individual movement of specific points of an image, using the apparatus described with reference to FIGS. 1 to 4 of the accompanying drawings, is a time consuming operation. For each frame of film clip or video clip, a large number of individual points must be relocated using the touch tablet 105 and the stylus 104. For a clip of film or video having a number N individual frames, an image will generally move from frame to frame, and the warp may need to be effected on a frame by frame basis. Consequently, smoothing of the warp also may need to be effected on a frame by frame basis leading to a large number of individual manual point movements using the stylus 104 and touch tablet 105.

Figure 9:
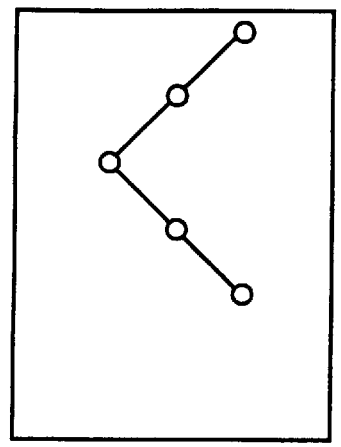
FIG. 9 shows the image of FIG. 7 in a successive I+20th frame.
Figure 10:
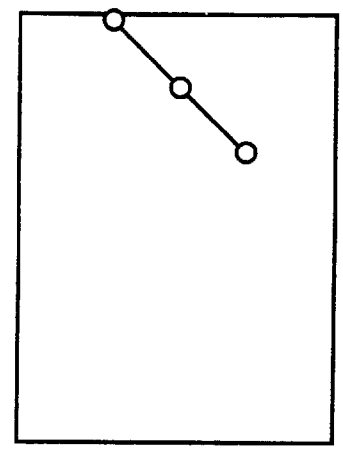
FIG. 10 shows the I+20th frame after having a smoothing operation as carried out in FIGS. 7 and 8.
Figure 11:
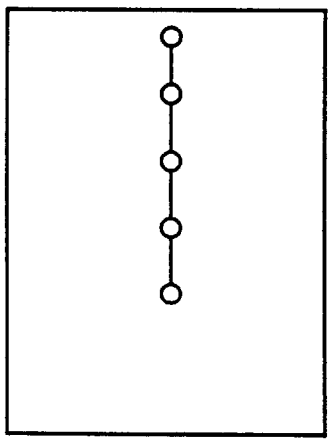
FIG. 11 shows a successive I+Nth frame.
Figure 12:
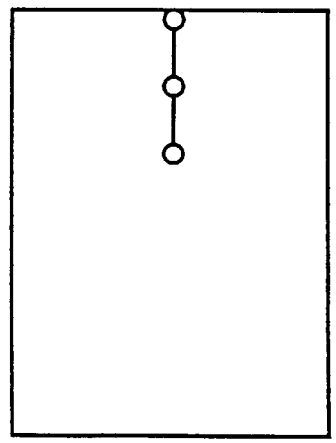
FIG. 12 shows the I+Nth frame after the individual smoothing operation.

FIGS. 9 and 10 show illustratively an I+20th frame of the clip before and after warping and manual post warp smoothing, and FIGS. 11 and 12 show respectively an illustrative I+Nth frame both before and after warping and manual post warp smoothing.

An example of the specific method according to the present invention will now be described.

In the following discussion, movement of points of an image are described. It will be understood that where movement of a "point" is described, this relates to movement of one or more pixels on display screen 103 or the graphics tablet 105. Corresponding pixel data and image data is modified in accordance with movements of pixels, and so where movement of parts of an image frame to new positions within the image frame are described, corresponding processing of image data occurs in the image processor 107.

Figure 13:
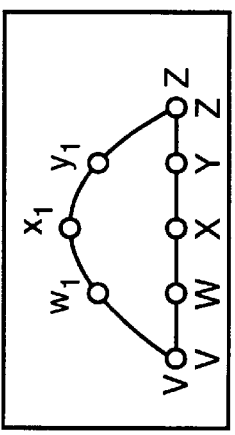
FIG. 13 shows schematically a method of smoothing a group of vertices in accordance with a preferred method of the present invention.

Referring to FIG. 13 of the accompanying drawings, an image characterized by individual points V,W,X,Y,Z at initial positions v, w, x, y, z is to be warped to a new position at points v, w1, x1, y1, z. A point, e.g., point X, is identified as a source point by manipulation of a cursor on the visual display unit 103 in response to manual operation of an interface device, for example the stylus 104 and the touch tablet 105. Using the stylus and touch tablet, the point X is dragged to a new position x1.

The central processing unit 201 identifies points related to the identified source point X, in this case related points V, W, Y and Z. The processor applies a proportionality distribution function in order to move the related points V,W,Y and Z in accordance with a predetermined distribution, which is proportional to the distance which the source point X has been moved from its source position to its destination position. For example, in FIG. 13 source point X is translated from its original position within the frame (its source position) to a new position x1, its destination position.

Related points V, W, Y and Z are translated to respective destination positions v, w1, y1, z.

Figure 14:
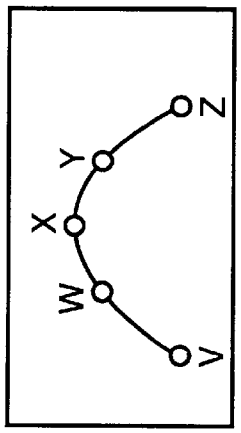
FIG. 14 shows the group of vertices in smoothed form.

In FIG. 13 in the case of the points V and Z, the source positions of these related points are the same as their destination positions, i.e. the points V and Z stay where they are in relation to the frame. However, points W and Y are moved from their initial source positions to new destination positions w1, y1. The resultant destination positions of points V to Z are shown in FIG. 14.

Figure 16:
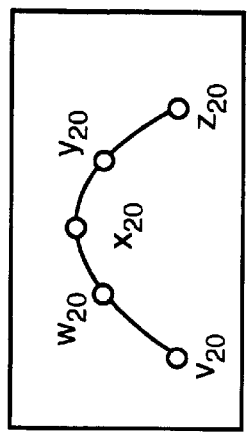
FIG. 16 shows the smoothed image of FIG. 15 in the I+20th frame.
Figure 18:
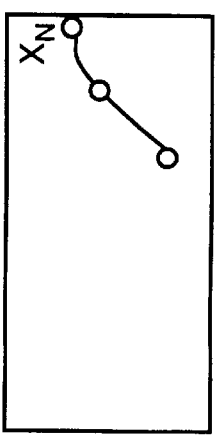
FIG. 18 shows the smoothed image in the I+Nth frame.
Figure 15:
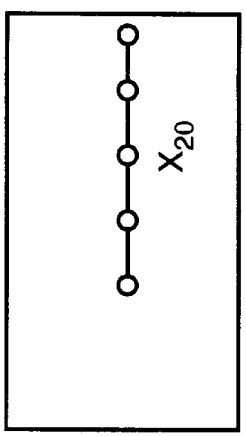
FIG. 15 shows the image of FIG. 13, in and I+20th frame.
Figure 17:
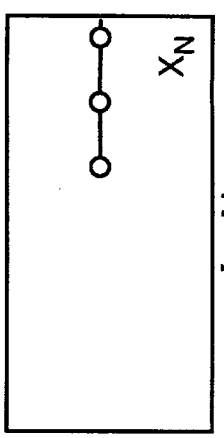
FIG. 17 shows a portion of the image in an I+Nth frame.

Referring to FIGS. 15 and 16, in the I+20th frame of the clip, the image has moved compared to the Ith frame and so the source point X20 needs to be moved from its source position in the I+20th frame to its destination position x20 as shown in FIG. 16. The line in FIG. 16 illustrates the destination positions of related points V20, W20, Y20, Z20. Similarly, in the I+Nth frame, the image has moved relative to the frame even further, and again the image needs to be identified with reference to a source point XN, which is moved from a source position to a destination position XN.

Thus, for each frame an identified feature of an image may be moved by identifying a source point of that image data, the source point of the image data from a source position to a destination position, and by moving further related points of the image move automatically under control of the central processing unit and in accordance with a predetermined proportionality distribution function by an amount relative to the distance between the source point and the destination point, the amount being determined by the proportionality distribution function.

Figure 19:
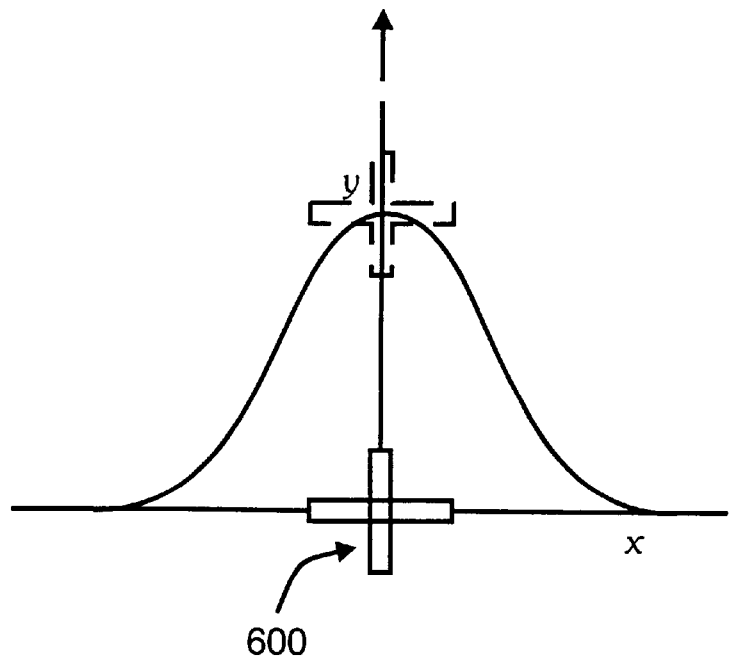
FIG. 19 illustrates a proportionality distribution function according to a preferred method of the present invention.

Referring to FIG. 19 of the accompanying drawings, an example of a proportionality distribution function is shown with reference to a "+" electronic cursor 600. The cursor is shown as moving in a vertical direction with reference to the frame. The proportionality function is defined as having a y axis in the direction of movement of the cursor, in this case vertically with reference to the frame, and an x axis in a direction transverse to the movement of direction of the cursor. In this case, the x axis of the function happens to be perpendicular to the direction of movement of the cursor, but is not necessarily so.

In the case shown in FIG. 19, the proportionality function comprises a substantially gaussian function. The maximum extent of the gaussian function in the y direction is preferably set, such that it corresponds to the distance moved between the source point and the destination point by the cursor. At positions either side of the cursor, related points are moved to a lesser extent, being a proportion of the distance moved by the cursor.

The width of the gaussian function may be determined, to enable related points within a predetermined distance from the source point to move with the source point. Selection of the width of the proportional distribution function determines the fineness or coarseness of the smoothing effect.

Figure 20:
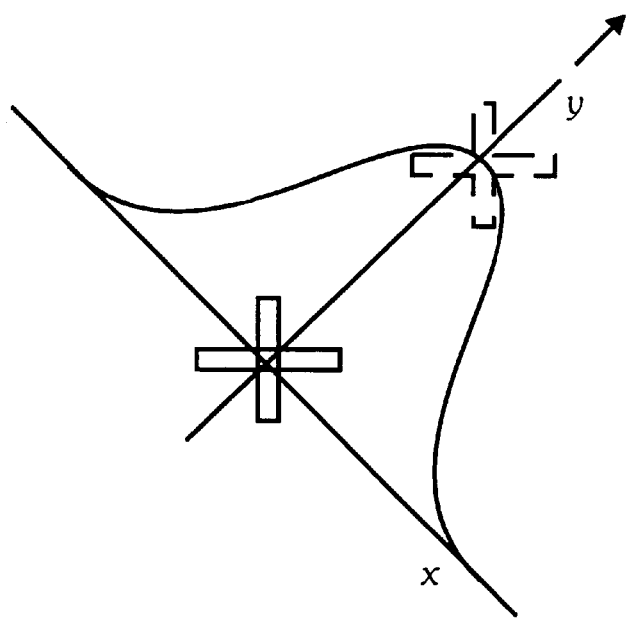
FIG. 20 shows a second proportionality distribution function.

Referring to FIG. 20, movement of the cursor is made diagonally across a frame. In this case the proportional distribution function is defined in the y direction as being in a direction diagonally across the frame and in the x direction, transverse to the y direction.

Related points may be identified by way of intensity, color, or their initial unwarped position.

Figure 21:
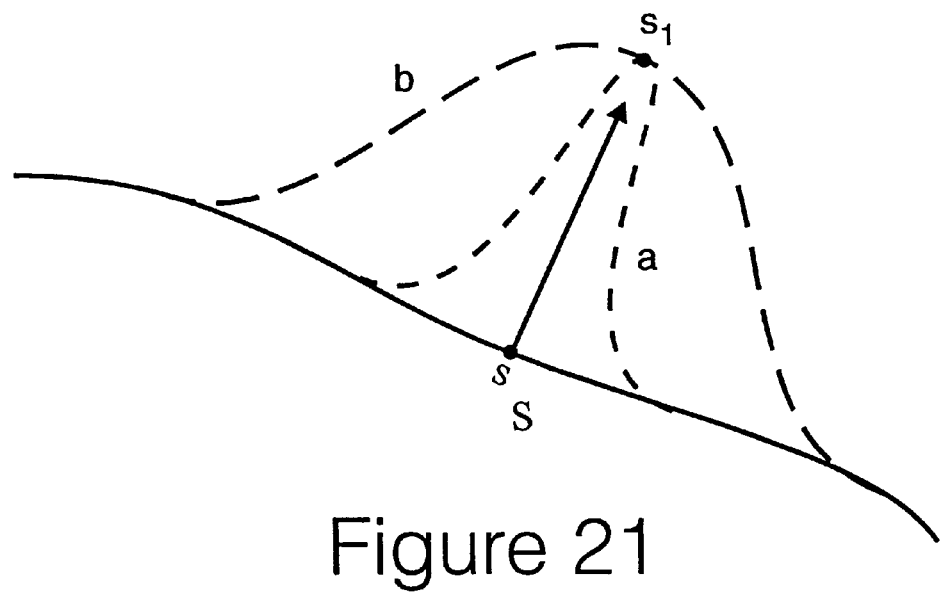
FIG. 21 illustrates smoothing of an edge feature in accordance with the preferred method of the present invention.
Figure 22:
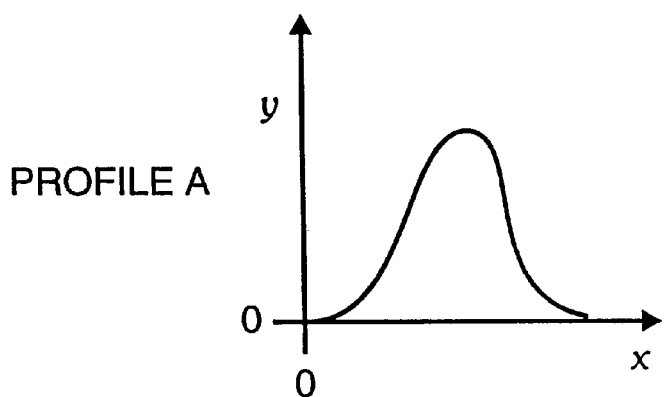
FIG. 22 shows a third proportionality distribution function as may be applied in FIG. 21.
Figure 23:
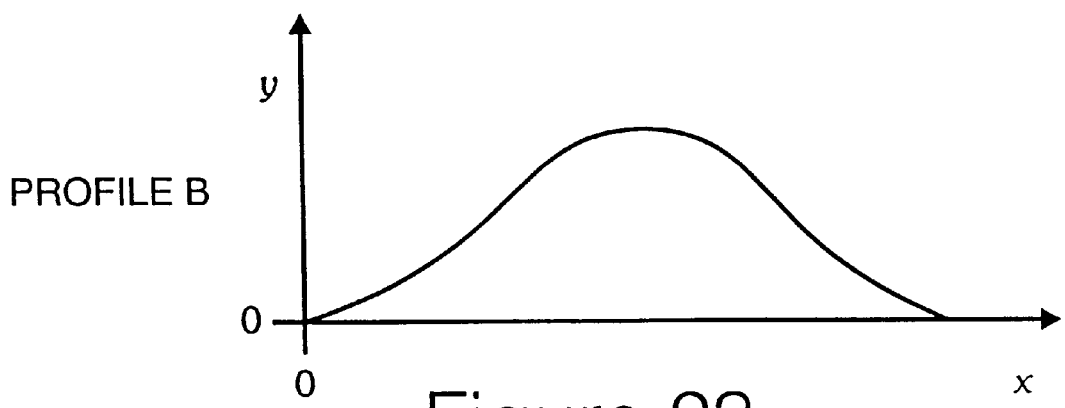
FIG. 23 shows a fourth proportionality distribution function as may be applied in FIG. 21.

Referring to FIG. 21 of the accompanying drawings, there is illustrated a source point S at a source position s, which is moved to a destination position s1. The effect of applying a proportional distribution function as shown in FIG. 22, having a relatively narrow width (trace a) and another proportional distribution function as shown in FIG. 23, having a relatively wide width (trace b) as shown in FIG. 21.

The maximum magnitude of the proportionality function in the y direction is the distance s–s1, in FIG. 21, and at x positions either side of the maximum value, the value of the proportionality function is less than the distance s–s1. The maximum magnitude of the proportionality function may be varied or preset as a percentage of the distance between the source point and the destination point.

Figure 24:
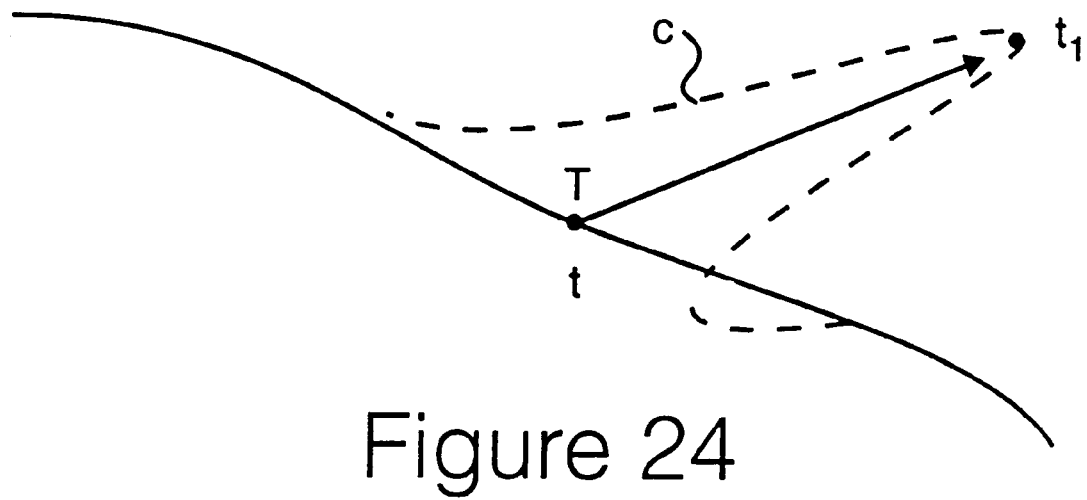
FIGS. 24 shows a second example of smoothing in accordance with the preferred methods of the present invention.
Figure 25:
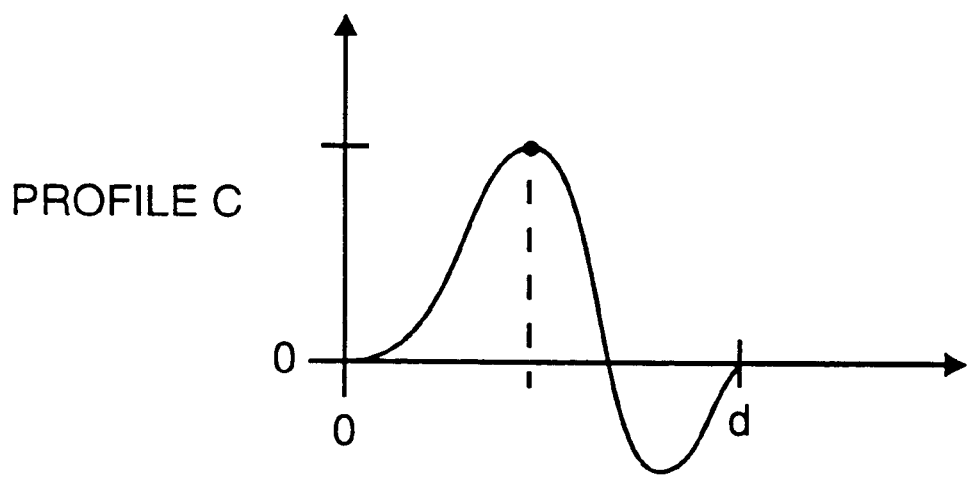
FIG. 25 illustrates a further proportionality distribution function as applied in the smoothing of FIG. 24.

Referring to FIG. 24 herein, another identified source point T at source position t is moved to a destination position t1. In this case, a proportional distribution function having a partially negative effect, as shown with reference to FIG. 25 is applied. The function extends over a distance in the x direction of width d transverse to the direction of the movement t–t1.

The effect on the image feature, denoted by the line in FIG. 24, is that movement of the source point T to the destination position t1 results in the trace c as shown in FIG. 24, in which a portion of the image feature corresponding to related points actually moves away from the destination point t1 as the source point T is translated from position t to t1.

I claim:

1. A method of processing image data comprising a plurality of picture points, said plurality including a group of displayed picture points making up an image, each of said displayed picture points being relocatable in response to manual operation of an interface device, the method comprising:

moving a displayed picture point, hereinafter "identified picture point", by a displacement in direct response to said manual operation, thereby to define a to-be-performed warp operation;

calculating a proportionality distribution function based on said displacement, said proportionality distribution function comprises gaussian distribution; and moving a number of additional displayed picture points, hereinafter "related picture points", said related picture points being fewer than all displayed picture points in said image, said related picture points being included in said group and being related to said identified picture point by a predetermined relation selected from a group consisting of intensity, color and initial unwarped position, said related picture points being moved by a displacement which differs from the displacement of said identified picture point in accordance with said proportionality distribution function, such that the displacement of each related picture point differs from the displacement of said identified picture point in proportion to a distance of said each related picture point from the identified picture point, thereby to perform said to-be-performed warp operation.

2. The method according to claim 1, wherein the height of said gaussian distribution is defined by said displacement of said identified picture point.

3. The method according to claim 1, wherein the width of said gaussian distribution is selected to enable said related points to move in accordance with said proportional distribution function.

4. An image data processing apparatus, comprising:

display means for displaying picture images in the form of a plurality of picture points, said plurality including a group of displayed picture points making up an image;

a manually operable interface device; and processing means configured to:

(i) relocate the position of each of said displayed picture points in response to manual operation of said manually operable interface device, wherein said displayed picture points are relocatable in response to said manual operation; and a displayed picture point, hereinafter "identified picture point", is moved by a displacement in direct response to said manual operation, thereby to define a to-be-performed warp operation;

(ii) calculate a proportionality distribution function based on said displacement said proportionality distribution function comprises gaussian distribution; and (iii) move a number of additional displayed picture points, hereinafter "related picture points", said related picture points being fewer than all displayed picture points in said image, said related picture points being included in said group and being related to said identified picture point by a predetermined relation selected from a group consisting of intensity, color and initial unwarped position, said related picture points being moved by a displacement which differs from the displacement of said identified picture point in accordance with said proportionality distribution function, such that the displacement of each related picture point differs from the displacement of said identified picture point in proportion to a distance of said each related picture point from the identified picture point, thereby to perform said to-be-performed warp operation.

5. The apparatus according to claim 4, wherein the height of said gaussian distribution is defined by said displacement of said identified picture point.

6. The apparatus according to claim 4, wherein the width of said gaussian distribution is selected to enable said related points to move in accordance with said proportional distribution function.

7. A method of processing image data comprising a plurality of picture points, said plurality including a group of displayed picture points making up an image, each of said displayed picture points being relocatable in response to manual operation of an interface device, comprising:

moving a displayed picture point, hereinafter "identified picture point", by a displacement in direct response to said manual operation, thereby to define a to-be-performed warp operation;

calculating a function based on said displacement in proportion to a distance from said identified picture point said function comprises gaussian distribution; and moving a number of additional displayed picture points, hereinafter "related picture points", said related picture points being included in said group and being related to said identified picture point by a predetermined relation selected from a group consisting of intensity, color and initial unwarped position, said related picture points being moved in accordance with said proportionality distribution function, thereby to perform said to-be-performed warp operation.

8. An image data processing apparatus, comprising:

display means for displaying picture images in the form of a plurality of picture points, said plurality including a group of displayed picture points making up an image;

a manually operable interface device; and processing means configured to:

(i) relocate the position of each of said displayed picture points in response to manual operation of said manually operable interface device, wherein said displayed picture points are relocatable in response to said manual operation; and a displayed picture point, hereinafter "identified picture point", is moved by a displacement in direct response to said manual operation to define a to-be-performed warp operation;

(ii) calculate a function based on said displacement in proportion to a distance from said identified picture point said function comprises gaussian distribution; and (iii) move a number of additional displayed picture points, hereinafter "related picture points", said related picture points being included in said group and being related to said identified picture point by a predetermined relation selected from a group consisting of intensity, color and initial unwarped position, said related picture points being moved in accordance with said proportionality distribution function, thereby to perform said to-be-performed warp operation.

* * * * *